(12) United States Patent
Li et al.

(10) Patent No.: US 8,365,537 B2
(45) Date of Patent: Feb. 5, 2013

(54) POWER PLANT WITH $CO_2$ CAPTURE

(75) Inventors: Hongtao Li, Aarau (CH); Holger Nagel, Stuttgart (DE); Tjiptady Nugroho, Fislisbach (CH); Celine Mahieux, Baden (CH)

(73) Assignee: Alstom Technology Ltd, Baden (CH)

( * ) Notice: Subject to any disclaimer, the term of this patent is extended or adjusted under 35 U.S.C. 154(b) by 0 days.

(21) Appl. No.: 13/157,897

(22) Filed: Jun. 10, 2011

(65) Prior Publication Data

US 2011/0314815 A1 Dec. 29, 2011

Related U.S. Application Data

(63) Continuation of application No. PCT/EP2009/067674, filed on Dec. 21, 2009.

(30) Foreign Application Priority Data

Dec. 24, 2008 (EP) .................................. 08172880

(51) Int. Cl.
*F02C 3/34* (2006.01)
*F02C 6/18* (2006.01)

(52) U.S. Cl. ........................ 60/772; 60/39.182; 60/39.52

(58) Field of Classification Search .................... 60/772, 60/39.182, 39.52

See application file for complete search history.

(56) References Cited

U.S. PATENT DOCUMENTS

| | | | | |
|---|---|---|---|---|
| 3,703,807 A | * | 11/1972 | Rice | ............................ 60/39.182 |
| 5,790,420 A | * | 8/1998 | Lang | ............................. 73/23.31 |
| 6,598,402 B2 | * | 7/2003 | Kataoka et al. | ............... 60/39.52 |
| 6,945,052 B2 | * | 9/2005 | Frutschi et al. | ............ 60/39.182 |
| 2002/0023423 A1 | | 2/2002 | Viteri et al. | |
| 2007/0034704 A1 | | 2/2007 | Hu et al. | |
| 2008/0010967 A1 | * | 1/2008 | Griffin et al. | ................. 60/39.52 |
| 2008/0060346 A1 | | 3/2008 | Asen et al. | |
| 2009/0145127 A1 | | 6/2009 | Vollmer et al. | |

FOREIGN PATENT DOCUMENTS

| | | |
|---|---|---|
| CA | 2109963 A1 | 12/1992 |
| EP | 2067941 A2 | 6/2009 |
| WO | 9221858 A1 | 12/1992 |

OTHER PUBLICATIONS

O. Bolland and S. Saether "New Concepts for Natural Gas Fired Power Plants Which Simplify the Recovery of Carbon Dioxide" Energy Convers. Mgmt., vol. 33, No. 5-8, pp. 467-475, 1992.

* cited by examiner

*Primary Examiner* — Ted Kim
(74) *Attorney, Agent, or Firm* — Volpe and Koenig, P.C.

(57) ABSTRACT

A method is provided for operating a combined cycle power plant having at least one gas turbine, a heat recovery steam generator (HSRG), a steam turbine and a CO2 capture system. The method includes recirculating a first partial flow of flue gases from the HRSG. The method also includes capturing CO2 from a second partial flow of flue gases from the HRSG; and operating a supplementary firing to increase the net power output of the plant and to at least partly compensate the power consumption of the CO2 capture system. A combined cycle power plant is also provided. The plant includes at least one gas turbine, at least one heat recovery steam generator, at least one steam turbine at least one $CO_2$ capture system, and flue gas recirculation. The plant also includes a low excess air supplementary firing.

15 Claims, 3 Drawing Sheets

POWER PLANT WITH CO₂ CAPTURE

CROSS REFERENCE TO RELATED APPLICATION

This application is a continuation of International Application No. PCT/EP2009/067674 filed Dec. 21, 2009, which claims priority to European Patent Application No. 08172880.0, filed Dec. 24, 2008, the entire contents of all of which are incorporated by reference as if fully set forth.

FIELD OF INVENTION

The invention relates to combined cycle power plants with integrated $CO_2$ capture and supplementary firing as well as to their operation.

BACKGROUND

In recent years it has become obvious that the generation of greenhouse gases leads to global warming and that further increase in greenhouse gas production will accelerate global warming. Since $CO_2$ (carbon dioxide) is identified as a main greenhouse gas, CCS (carbon capture and storage) is considered as one of the potential major means to reduce the release of greenhouse gases into the atmosphere and to control global warming. In this context CCS is defined as the process of $CO_2$ capture, compression, transport and storage. Capture is defined as a process, in which $CO_2$ is removed either from the flue gases after combustion of a carbon based fuel or the removal of and processing of carbon before combustion. Regeneration of any absorbents, adsorbents or other means to remove $CO_2$ from a flue gas or fuel gas flow is considered to be part of the capture process.

Backend $CO_2$ capture, also called post-combustion capture, is a commercially promising technology for fossil fueled power plants including CCPP (combined cycle power plants). In post-combustion capture the $CO_2$ is removed from a flue gas. The remaining flue gas is released to the atmosphere and the $CO_2$ is compressed for transportation, and storage. There are several technologies known to remove $CO_2$ from a flue gas such as absorption, adsorption, membrane separation, and cryogenic separation. Power plants with post combustion capture are the subject of this invention.

All known technologies for $CO_2$ capture require relatively large amounts of energy. Due to the relatively low $CO_2$ concentration of only about 4% in the flue gases of a conventional CCPP, the $CO_2$ capture system (also called $CO_2$ capture plant or $CO_2$ capture equipment) for a conventional CCPP will be more costly and energy consuming per kg of captured $CO_2$ than one for other types of power plants, which have flue gas flows at higher $CO_2$ concentrations.

The $CO_2$ concentration in the CCPP flue gas depends on the fuel composition, the gas turbine type and load and may vary substantially depending on the operating conditions of the gas turbine. This variation in $CO_2$ concentration can be detrimental to the performance, efficiency, and operatability of the $CO_2$ capture system.

To increase the $CO_2$ concentration in the flue gases of a CCPP two main concepts are known. One is the recirculation of flue gases as for example described by O. Bolland and S. Saether in, NEW CONCEPTS FOR NATURAL GAS FIRED POWER PLANTS WHICH SIMPLIFY THE RECOVERY OF CARBON DIOXIDE" (Energy Conyers. Mgmt Vol. 33, No. 5-8, pp. 467-475, 1992)). Another one is the so called tandem arrangement of plants, where the flue gas of a first CCPP is cooled down and used as inlet gas for a second CCPP to obtain a flue gas with increased $CO_2$ concentration in the flue gas of the second CCPP. Such an arrangement is for example described in US20080060346. These methods reduce the total flue gas flow, increase the $CO_2$ concentration, and thereby reduce the required flow capacity of absorber and power consumption of the capture system.

These methods, as well as many further published methods for the optimization of the different process steps, and the reduction of the power and efficiency penalties by integrating these processes into a power plant, aim to reduce the capital expenditure and the power requirements of $CO_2$ capture system.

SUMMARY

The present disclosure is directed to a method for operating a combined cycle power plant having at least one gas turbine, a heat recovery steam generator (HSRG), a steam turbine and a CO2 capture system. The method includes recirculating a first partial flow of flue gases from the HRSG. The method also includes capturing CO2 from a second partial flow of flue gases from the HRSG; and operating a supplementary firing to increase the net power output of the plant and to at least partly compensate the power consumption of the CO2 capture system.

In another aspect, the present disclosure is directed to a combined cycle power plant. The plant includes at least one gas turbine, at least one heat recovery steam generator, at least one steam turbine at least one $CO_2$ capture system, and flue gas recirculation. The plant also includes a low excess air supplementary firing.

BRIEF DESCRIPTION OF THE DRAWINGS

The invention, its nature as well as its advantages, shall be described in more detail below with the aid of the accompanying drawings. Referring to the drawings.

DETAILED DESCRIPTION OF THE PREFERRED EMBODIMENTS

Introduction to the Embodiments

Figure 1:
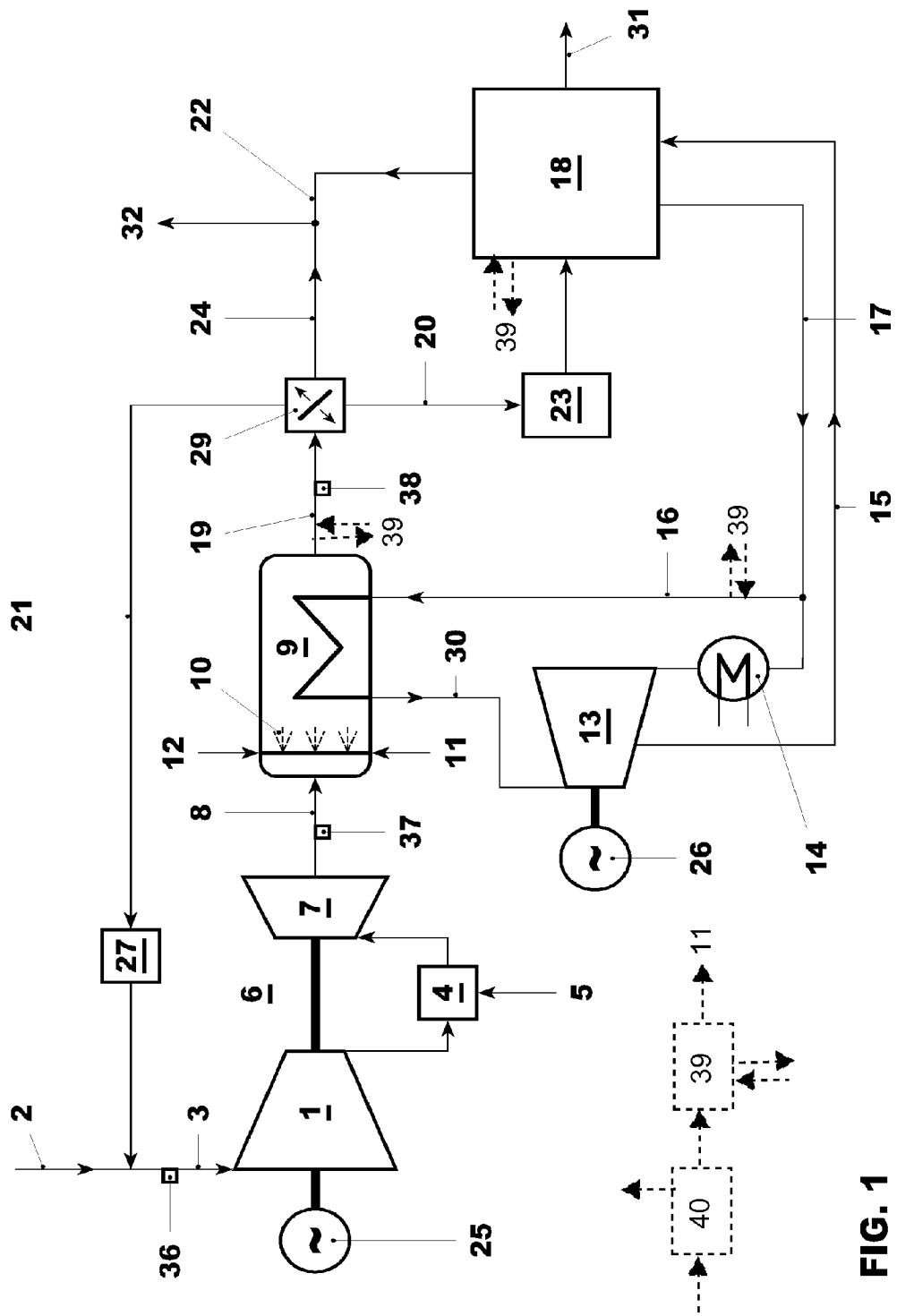
FIG. 1 schematically shows a CCPP with backend $CO_2$ absorption including flue gas recirculation and low excess air ratio supplementary firing.

An objective of the present invention is to provide a combined cycle power plant (CCPP) comprising at least one gas turbine, one heat recovery steam generator (HRSG), one steam turbine, and carbon dioxide ($CO_2$) capture system with enhanced operational flexibility, and to reduce capacity penalties for $CO_2$ capture as well as an operating method for such a CCPP.

In particular the impact of $CO_2$ capture on the capacity of a CCPP is to be minimized, i.e. the electric power delivered to the power grid by the plant including the $CO_2$ capture system is to be maximized.

To this end an operating method for a CCPP with flue gas recirculation, $CO_2$ capture and supplementary firing is proposed as well as a plant to carry out such a method. The essence of the invention is an operating method for a CCPP with flue gas recirculation, which allows operation of a supplementary firing burner in flue gases of a CCPP with flue gas recirculation, which at least partially compensates for the power requirements of the $CO_2$ capture system. The supplementary firing burner can be installed in the HRSG of the CCPP or as a duct firing in the flue duct from the gas turbine to the HRSG.

For flue gas recirculation, the flue gas flow of a gas turbine is split into at least two partial flows downstream of the HRSG. A first partial flow is returned to the inlet of the gas turbine via a flue gas recirculation line, and a second partial flow is directed via the $CO_2$ capture system to the stack for release to the environment. Further, a bypass around the $CO_2$ capture system for direct release of flue gases to the environment can be provided to increase the operational flexibility. This allows any combination of recirculation rate, of flue gas flow to $CO_2$ capture unit, and direct flue gas flow to the stack without $CO_2$ capture.

Flue gas recirculation is applied to minimize the $CO_2$ capture system's size, its costs, and its power requirements. For optimized $CO_2$ capture the flue gas recirculation rate should be maximized. The recirculation rate is defined as the ratio of flue gas mass flow from the gas turbine, which is recirculated to the compressor inlet, to the total flue gas mass flow of the gas turbine.

For high $CO_2$ capture efficiency and to minimize the flue gas mass flow, the oxygen concentration in the flue gas would ideally be 0%. Due to cooling air, which bypasses the gas turbine's combustion chamber, and excess oxygen needed to assure complete combustion, recirculation is limited and some residual oxygen remains in the exhaust gas even with recirculation. Typical recirculation rates determined by the operational requirements of the gas turbine are in the order of 30% to 50% for base load operation.

Conventional supplementary firing burners are designed for residual oxygen concentration of 10% or more in the flue gas. The residual oxygen concentration after a gas turbine with flue gas recirculation is typically lower than 10% and is not sufficient for conventional supplementary firing burner. In order to enable operation under the boundary conditions of flue gases from a gas turbine with flue gas recirculation, the use of a low excess air supplementary firing burner is proposed. In this context a low excess air supplementary firing burner is a burner, which can be operated in a gas flow with less than 10% oxygen concentration with a low stoichiometric ratio. The stoichiometric ratio for this kind of a low excess air supplementary firing burner should be below 2, preferably below 1.5 or even below 1.2. Ideally this kind of burner can operate with a stoichiometric ratio as close as possible to 1.

A conventional duct burner or an interstage burner could be used with additional air supply at a high excess air ratio. However, this would dilute the $CO_2$ concentration in the flue gas and increase the flue gas flow. It is therefore not an adequate solution for this application.

Instead of using $CO_2$ concentration or oxygen concentration the $CO_2$ content, respectively the oxygen content can also be used in the context of this invention.

In one embodiment, the recirculation rate can be controlled by at least one control body. This can for example be a controllable damper or a fixed splitter with a control body like a flap or valve in one or both of the flue gas lines downstream of the splitter.

This allows for example to control the recirculation rate to the highest possible rate under the conditions, that stable complete combustion in the gas turbine can be maintained, and that the residual oxygen concentration after the gas turbine is sufficient to maintain stable complete combustion of the supplementary firing.

Stable complete combustion in this context means, that CO and unburned hydrocarbon emissions stay below the required level, which is in the order of ppm or single digit ppms and that the combustion pulsations stay within the normal design values. Emission levels are typically prescribed by guarantee values. Design values for pulsation depend on the gas turbine, operating point, and combustor design, as well as on the pulsation frequency. They should remain well below 10% of the combustor pressure. Typically they stay below 1 or 2% of the combustor pressure.

The recirculation rate can for example also be used to control the oxygen concentration of the compressor inlet gases after mixing ambient air with the recirculation flow. The target oxygen concentration of the inlet gasses can for example be a fixed value, which is sufficient to assure stable, complete combustion in the gas turbine under all operating conditions.

In a further embodiment, the target oxygen concentration of the flue gases is a function of relative load of the supplementary firing. It can be minimized according to the requirements of the gas turbine as long as the supplementary firing is switched off. Once supplementary firing is switched on, the requirements of the gas turbine and of the supplementary firing have to be considered. The larger one of the two requirements determines the target residual oxygen concentration of the flue gas. The required residual oxygen concentration for the supplementary firing itself can be a fixed value or a function of the burner load of the supplementary firing.

Further, in order to assure complete stable combustion of the supplementary firing, introduction of additional air, and/or oxygen enriched air, and/or oxygen into the burner or upstream of the burner of the supplementary firing is proposed.

In a further embodiment the recirculation rate can be a fixed rate or determined independently of the supplementary firing. In order to assure complete stable combustion of the supplementary firing under these conditions, the additional airflow, and/or oxygen enriched airflow, and/or oxygen flow is controlled.

The additional airflow, and/or oxygen enriched airflow, and/or oxygen flow can be a fixed flow. However, excess air or oxygen should be avoided in the flue gases in order to keep the efficiency of the $CO_2$ capture high. Therefore a control of the additional air, and/or oxygen enriched air, and/or oxygen flow is proposed.

In one embodiment the additional airflow, and/or oxygen enriched airflow, and/or oxygen flow is controlled as a function of the flue gas recirculation rate.

In another embodiment the additional airflow, and/or oxygen enriched airflow, and/or oxygen flow is controlled as a function of residual oxygen concentration of the flue gases of the gas turbine.

In a further embodiment the additional airflow, and/or oxygen enriched airflow, and/or oxygen flow is controlled as a function of the relative load of the supplementary firing.

Further parameters, such as the flue gas temperatures before and after the supplementary firing, the flue gas flow velocity etc. can be used.

A combination of the above control parameters and targets is possible. For example good operation conditions for the supplementary firing can be obtained with a combination of control as function of residual oxygen concentration of the flue gases and of load of supplementary firing.

To optimize the efficiency the additional ambient air flow, and/or oxygen enriched airflow, and/or oxygen flow is preheated by low-grade heat from a water steam cycle of the combined cycle power plant, and/or the $CO_2$ capture system, and/or the flue gases.

Besides the method, a corresponding combined cycle power plant (CCPP) is also part of the invention.

The CCPP comprises at least one gas turbine, one HRSG, one steam turbine, $CO_2$ capture system and a supplementary firing. Further, it comprises one recirculation line and one flue gas line to the $CO_2$ capture system.

According to one embodiment a low excess air supplementary firing is provided in the HRSG of the combined cycle power plant.

In a further embodiment ambient air, and/or oxygen enriched air, and/or oxygen supply lines to the low excess supplementary firing is provided.

Additionally, an oxygen enrichment plant and/or an air separation unit can be provided.

Further, at least one oxygen measurement or $CO_2$ measurement device can be installed to measure the oxygen concentration or $CO_2$ concentration of the inlet gases of the compressor inlet gas and/or to measure the residual oxygen concentration of the hot flue gases of the gas turbine and/or to measure the residual oxygen concentration of the flue gases from the HRSG.

In addition to compensating power losses due to the $CO_2$ capture, the supplementary firing can also be used to increase the plant flexibility and to provide power to compensate the influence of variations in the ambient conditions or to cover periods of peak power demand.

Typically, the recirculated flue gas has to be further cooled after the HRSG by a re-cooler before mixing it with ambient air for reintroduction into the compressor of the gas turbine. In one embodiment the control body for controlling the recirculation rate is installed downstream of this re-cooler to reduce thermal load on this control body.

DETAILED DESCRIPTION

A power plant for execution of the proposed method includes a conventional CCPP, equipment for flue gas recirculation, a supplementary firing 10, plus a $CO_2$ capture system 18.

A typical arrangement with post combustion capture, flue gas recirculation, and supplementary firing 10 is shown in FIG. 1. A gas turbine 6, which drives a first generator 25, is supplied with compressor inlet gas 3, and fuel 5. The compressor inlet gas 3 is a mixture of ambient air 2, and a first partial flow 21 of the flue gases, which is recirculated via a flue gas recirculation line. The inlet gas is compressed in the compressor 1. The compressed gas is used for combustion of fuel 5 in a combustor 4, and pressurized hot gasses expand in a turbine 7. Its main outputs are electric power, and hot flue gasses 8.

The gas turbine's hot flue gasses 8 pass through a HRSG 9, which generates steam 30 for a steam turbine 13. In the HRSG 9 or the flue gas duct from the gas turbine 6 to the HRSG 9 supplementary firing 10 is integrated. The supplementary firing is supplied with fuel gas 12 and ambient air/oxygen 11.

The steam turbine 13 either is arranged in a single shaft configuration with the gas turbine 6 and the first generator 25, or is arranged in a multi shaft configuration to drive a second generator 26. Further, steam is extracted from the steam turbine 13 and supplied via a steam line 15 to a $CO_2$ capture system 18. The steam is returned to the steam cycle as a condensate via a return line 17 and is reintroduced into the steam cycle. The steam cycle is simplified and shown schematically without different steam pressure levels, feed water pumps, etc., as these are not subject of the invention.

A first partial flow 21 of the flue gases 19 from the HRSG 9 is recirculated to the inlet of the compressor 1 of the gas turbine 6 where it is mixed with ambient air 2. The first partial flow 21 is cooled in the recirculation flue gas cooler 27 before mixing with the ambient air 2.

A second partial flow 20 of the flue gases 19 from the HRSG 9 is directed to the $CO_2$ capture system 18 by a damper 29.

A $CO_2$ capture system 18 typically consists of a $CO_2$ absorption unit, in which $CO_2$ is removed from the flue gas by an absorbent, and a regeneration unit, in which the $CO_2$ is released from the absorbent. Depending on the temperature of the second partial flow 20 of the flue gases, and the operating temperature range of the $CO_2$ absorption unit, a flue gas cooler 23 might also be required.

The $CO_2$ depleted flue gas 22 is released from the $CO_2$ capture system 18 to a stack 32. In case the $CO_2$ capture system 18 is not operating, operating at part load, and to increase operational flexibility, the flue gases from the HRSG can be bypassed or partly bypassed via the flue gas bypass 24.

In normal operation the captured $CO_2$ 31 will be compressed in a $CO_2$ compressor and the compressed $CO_2$ will be forwarded for storage or further treatment.

Measurement devices to measure the oxygen concentration and/or $CO_2$ concentration are proposed in order to better control the residual oxygen concentration. For example, an inlet air $CO_2$ and/or $O_2$ measurement device 36 can be applied for better control of inlet gas composition for the gas turbine 6. For the control of the gas turbine's flue gas composition a gas turbine flue gas $CO_2$ and/or $O_2$ measurement device 37 can for example be applied. To control the gas composition of the HRSG flue gas 19 a HRSG flue gas $CO_2$ and/or $O_2$ measurement device 38 can for example be applied.

Figure 2:
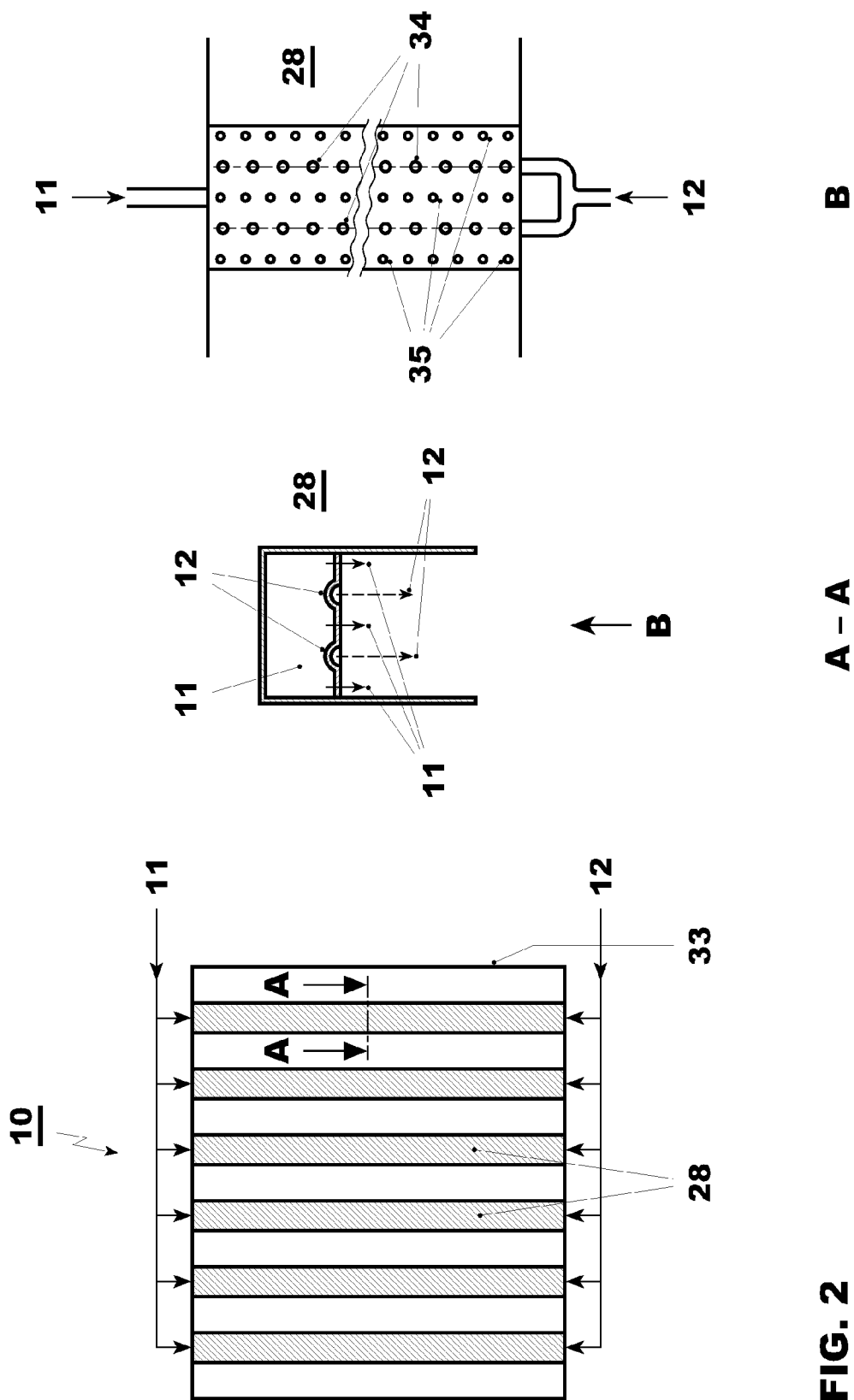
FIG. 2 schematically shows a low excess air ratio supplementary firing burner for application in a HRSG of a CCPP with flue gas recirculation.

An example of a supplementary firing 10 for burning fuel gas 12 with ambient air at low excess air ratio and with oxygen /oxygen enriched air 11 in an HRSG 9 is shown in FIG. 2. In the shown example burner boxes 28 for supplementary firing are arranged traversal, spaced apart in arrays in a cross section of the HRSG inlet 33 or inside the HRSG. Gas turbine flue gas 8 passes past the burner boxes 28 through the passages between the boxes while the flame of the supplementary firing is stabilized in them. Additional ambient air or oxygen 11 as well as fuel gas 12 are supplied to the burner boxes and injected via the fuel gas injection orifices 34 and the oxidizer injection orifices 35. Typically, oxygen is not injected directly into burner boxes 28 but diluted with some carrier gas like ambient air or recirculated flue gas before it comes into contact with the fuel gas 12.

In a conventional CCPP with HRSG and supplementary firing the oxygen concentration of the flue gases of the gas turbine 8 is not controlled and independent of the operation of supplementary firing. The supplementary firing typically is simply switched on, after the gas turbine reaches base load and operated independently of the gas turbine 8. Base load is typically the operating condition with the lowest residual oxygen concentration in the flue gases. The oxygen concentration stays practically constant at this level and only slight changes due to changes in the ambient conditions occur. However, this approach is not feasible with flue gas recirculation and minimized residual oxygen concentration in the hot flue gases from the gas turbine 8, as conventional supplementary firing does not work properly under these conditions.

Figure 3:
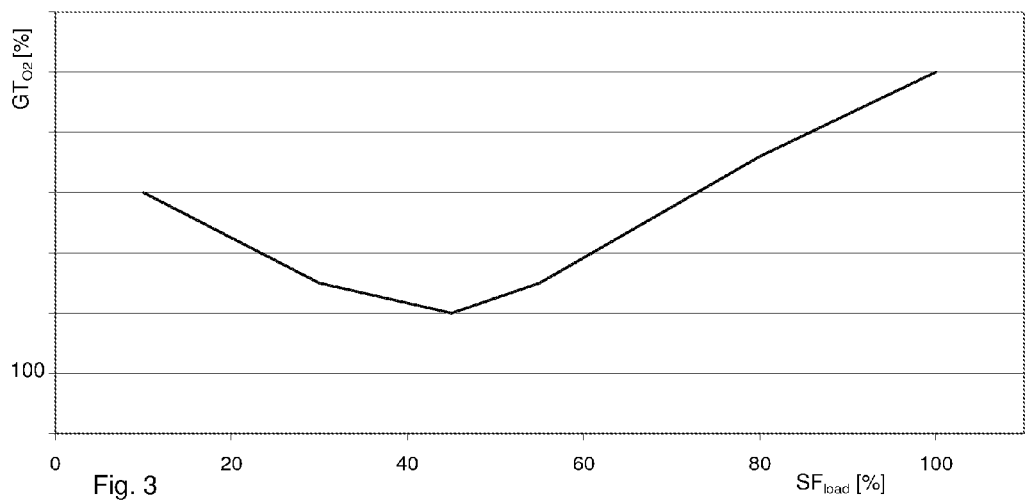
FIG. 3 schematically shows the normalized residual oxygen concentration of the gas turbine flue gas $GT_{O2}$ required for supplementary firing as a function of the relative load of the supplementary firing $SF_{load}$ without additional ambient air or oxygen supply.

In a first approach to maximize the $CO_2$ concentration of the flue gases 19 from the HRSG 9 with supplementary firing, the residual oxygen concentration after gas turbine $GT_{O2}$ is controlled as a function of the relative load of the supplementary firing as shown in FIG. 3. It is normalized with the minimum residual oxygen concentration of the flue gas from the gas turbine 8, which would be reached if the gas turbine 6 were operated at the recirculation limit of the gas turbines. For operation of the supplementary firing the residual oxygen concentration after gas turbine $GT_{O2}$ is higher than the minimum residual oxygen concentration of the flue gas required for the gas turbine operation. Therefore the recirculation rate is restricted to allow supplementary firing.

In this case, no additional ambient air flow, and/or oxygen enriched air flow, and/or oxygen flow 11 is supplied to the supplementary firing 10. The amount of residual oxygen content and concentration required to assure stable, complete combustion with low CO and unburned hydrocarbon emissions depends on the temperature level and amount of fuel gas, which needs to react. At low relative load of the supplementary firing 10, the temperature is low and a relatively high oxygen concentration is required to assure complete combustion. This leads to a high residual oxygen concentration after the supplementary firing $SF_{O2}$. With increasing load, the flame temperature increases and the required oxygen concentration drops until it reaches a minimum. For high relative load of the supplementary firing 10 the required oxygen concentration increases again and is proportional to the injected fuel gas flow. Depending on the design of the supplementary firing, the required residual oxygen concentration varies as a function of load. For example, a required oxygen concentration, which is proportional to the load, is possible. Further, the load range might be restricted to higher loads, e.g. 40% to 100% load. In any case, in order to maximize the resulting $CO_2$ after supplementary firing, a variation of the residual oxygen concentration of the flue gases from the gas turbine (GT) 8 is needed. This increases the complexity of the control integration, and can lead to combustion instabilities in the GT. Further, it leads to variation in the second partial flow 20 of the flue gases, which flows to the $CO_2$ capture system 18, as a function of the relative load of the supplementary firing. The required residual oxygen concentration for the supplementary firing can limit the recirculation ration and result in an increased maximum second partial flow 20.

Figure 4:
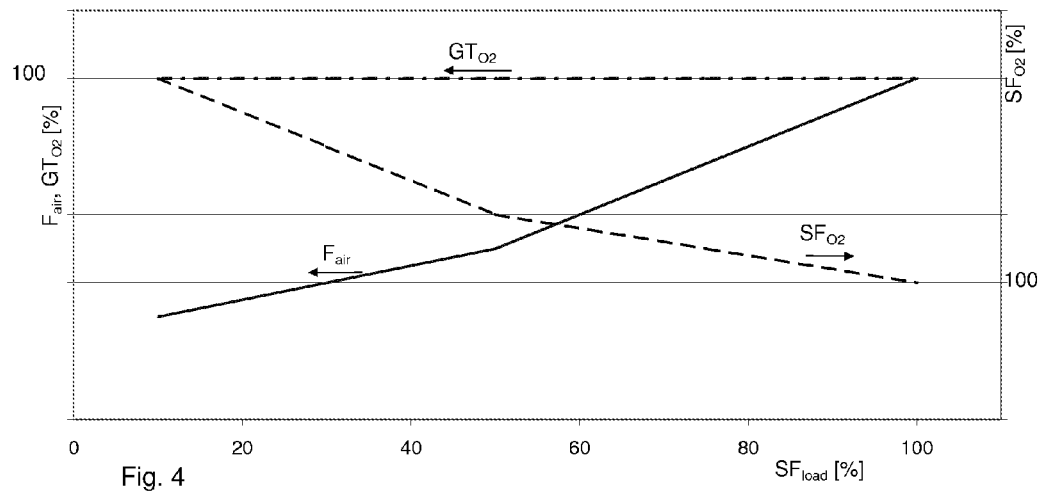
FIG. 4 schematically shows the normalized residual oxygen concentration of the gas turbine flue gas $GT_{O2}$ required for supplementary firing as a function of relative load of the supplementary firing $SF_{load}$ with additional ambient air or oxygen supply $F_{air}$ and the residual oxygen concentration after supplementary firing $SF_{O2}$.

In a proposed second approach, supplementary firing with additional ambient air, oxygen enriched air or oxygen flow $F_{air}$ from an oxygen enrichment plant/air separation unit 40 is applied. As schematically shown in FIG. 4, the normalized residual oxygen concentration of the gas turbine flue gas $GT_{O2}$ required for supplementary firing over relative load of the supplementary firing $SF_{load}$ can be kept constant independently of relative load of the supplementary firing. Therefore no complex control interface or logic between the gas turbine and supplementary firing is needed.

In this proposed second approach, the fuel gas is burned in the supplementary firing burner with an additional ambient airflow, oxygen enriched airflow or oxygen flow $F_{air}$. The supplementary firing burner can thereby work independently from gas turbine flue gas oxygen concentration and produces flue gas at low $O_2$ and high $CO_2$ concentrations. With this method it can be assured that after mixing the flue gases of the supplementary firing with flue gases of the gas turbine flue, the $CO_2$ concentration in the resulting flue gas mixture will not be or only very slightly diluted. Thus the flue gas recirculation rate could and shall be designed at its maximum allowed value to keep the minimal oxygen concentration i.e. the highest $CO_2$ concentration in the gas turbine flue gases while sending the minimum amount of flue gas from CCPP to the $CO_2$ capture plant.

Further, the normalized additional ambient air, oxygen enriched air or oxygen flow $F_{air}$ required to assure stable and complete combustion is also shown in FIG. 4. It is normalized with the additional ambient air or oxygen flow required at 100% load. At low relative load of the supplementary firing 10, the temperature is low and a relatively high ambient airflow, oxygen enriched airflow or oxygen flow $F_{air}$ is required to assure complete combustion. It is typically well above stoichiometric and results in high residual oxygen concentration $SF_{O2}$ after the supplementary firing. With increasing load the flame temperature increases and the required additional ambient airflow, oxygen enriched airflow or oxygen flow $F_{air}$ only increases at a low rate. The fuel specific additional ambient airflow, oxygen enriched airflow or oxygen flow $F_{air}$ can be reduced. Ideally almost stoichiometric combustion can be realized. For high relative load of the supplementary firing 10 the fuel specific additional ambient airflow, oxygen enriched airflow or oxygen flow $F_{air}$ stays almost constant. The required additional ambient airflow, oxygen enriched airflow or oxygen flow $F_{air}$ is mainly needed to assure a sufficient oxygen concentration for complete combustion and increases at a higher rate, which is proportional to the injected fuel gas flow. Depending on the design of the supplementary firing this dependency of required residual oxygen concentration as a function of load varies. Further, the load range might be restricted to higher loads, e.g. 40% to 100% load.

The resulting normalized residual oxygen concentration after supplementary firing $SF_{O2}$ is also shown in this Figure. It is normalized with the oxygen concentration after supplementary firing $SF_{O2}$ at 100% load. For this example it reaches a minimum at 100% load. At 100% load the combustion temperature is highest, which facilitates a fast complete combustion down to very low residual oxygen concentration and corresponding high $CO_2$ concentration.

In general the $CO_2$ concentration is inversely proportional to the residual oxygen concentration, and low oxygen concentration corresponds to a high $CO_2$ concentration.

The $CO_2$ and the residual oxygen concentration at different locations of the thermodynamic process of a CCPP can be determined using main process parameters. Based on the inlet mass flow, the recirculation rate, the fuel mass flows, mass flow of ambient airflow, oxygen enriched airflow or oxygen flow $F_{air}$ injected, and the combustion efficiency, the oxygen concentration and $CO_2$ concentration in the inlet gas, after the gas turbine, and after the supplementary firing can be estimated. These estimated values are used in one embodiment of the invention.

Since the inlet mass flow of a gas turbine is difficult to measure one normally has to rely on compressor characteristics to determine the inlet mass flow. Due to compressor ageing the real inlet mass flow can differ from the value of the characteristics. Further, the fuel's heating value depends on the fuel gas composition, which can change over time. Therefore either additional measurements like on line fuel gas analysis have to be applied or considerable uncertainties have to be taken into account. For practical reasons it is therefore often easier to measure the gas compositions directly. These measurements are part of a further embodiment. Corresponding measurement devices were indicated in FIG. 1.

Besides conventional gas chromatography there are several different methods, systems, and measurement devices to measure the oxygen concentration and $CO_2$ concentration of the different gas streams. $CO_2$ can for example easily be measured using Nondispersive Infrared (NDIR) $CO_2$ Sensors, or Chemical $CO_2$ Sensors. Oxygen concentration can, among others, be measured using zirconia, electrochemical or Galvanic, infrared, ultrasonic sensors, and laser technology. Fast online sensors can be applied for optimized operation.

Exemplary embodiments described above and in the drawings disclose to a person skilled in the art embodiments, which differ from the exemplary embodiments and which are contained in the scope of the invention.

For example, blowers might be advantageous for first partial flow 21 of the flue gases, which is recirculation or for the second partial flow 20 of the flue gases, which flows to the $CO_2$ capture system 18. Without blowers the pipes and equipment size needed to allow sufficient flow with existing pressure differences might become prohibitive.

Further, when an additional ambient airflow, oxygen enriched airflow or oxygen flow $F_{air}$ is used for the supplementary firing this flow can be preheated by low grade heat from the water steam cycle, and/or the $CO_2$ capture system 18, and/or the flue gases by a preheater 39. Return condensate from intermediate pressure feed water can for example be utilized for this.

Further, one could replace dampers or other control bodies, which inherently lead to a pressure drop, by controlled blowers. These could for example be variable speed blowers or blowers with controllable blade or guide vane angles.

LIST OF REFERENCE SYMBOLS

1 Compressor
2 Ambient air
3 Compressor inlet gas
4 Combustor
5 Fuel gas for GT
6 Gas turbine (GT)
7 Turbine
8 Hot flue gas from gas turbine
9 HRSG (heat recovery steam generator)
10 Low excess air supplementary firing (SF)
11 Ambient air, and/or oxygen enriched air, and/or oxygen
12 Fuel gas for supplementary firing
13 Steam turbine
14 Condenser
15 Steam extraction for $CO_2$ capture
16 Feed water
17 Condensate return line
18 $CO_2$ capture system
19 Flue gas from HRSG
20 Second partial flow (Flue gas $CO_2$ capture system)
21 First partial flow (Flue gas recirculation)
22 $CO_2$ depleted flue gas
23 Flue gas cooler
24 Flue gas bypass to stack
25 First generator
26 Second generator
27 Recirculation flue gas cooler
28 Burner box
29 Damper
30 Steam
31 Captured $CO_2$
32 Stack
33 Cross section of HRSG inlet
34 Fuel gas injection orifices
35 Oxidizer injection orifices
36 Inlet air $CO_2$ and/or O2 measurement devices
37 Gas turbine flue gas $CO_2$ and/or O2 measurement devices
38 HRSG flue gas $CO_2$ and/or O2 measurement devices
39 Preheater
40 Oxygen enrichment plant/air separation unit
CCPP Combined cycle power plant
$SF_{load}$ Relative load of supplementary firing (SF)
$GT_{O2}$ Normalized residual oxygen concentration after GT
$SF_{O2}$ Normalized residual oxygen concentration after SF
$F_{air}$ Normalized supplementary air/oxygen enriched air/oxygen flow

What is claimed is:

1. A method for operating a combined cycle power plant comprising at least one gas turbine (6), having a compressor (1), a combustor (4) and a turbine (7), a heat recovery steam generator (HSRG) (9), a steam turbine (13), a $CO_2$ capture system (18), a supplementary firing (10), which is integrated into the heat recovery steam generator (HSRG) (9) or installed as a duct firing (10) in the flue duct from the gas turbine to the heat recovery steam generator (HSRG) (9), and a flue gas recirculation line, the method comprising:
   mixing ambient air (2) and the first partial (21) flow of the flue gases (19);
   compressing the mixture of ambient air (2) and first partial flow (21);
   combusting fuel (5) in the combustor 4;
   expanding the pressurized hot combustion gasses in a turbine (7);
   passing the turbine's hot flue gases through a heat recovery steam generator (HSRG) (9), which generates steam (30);
   splitting the flue gas of the gas turbine into at least three partial flows downstream of the heat recovery steam generator (HSRG) (9);
   recirculating a first partial flow (21) of flue gases (19) from the HRSG (9) via the recirculation line to the compressor inlet;
   directing a second partial flow (20) of the flue gases (19) from the heat recovery steam generator (HSRG) (9) to the $CO_2$ capture system (18) and directing a third partial flow of flue gases from the HRSG to an exhaust stack;
   capturing $CO_2$ from a second partial flow (20) of flue gases (19) from the HRSG (9) and then exhausting a remaining second partial flow of flue gases from the exhaust stack;
   operating the supplementary firing (10) to increase the net power output of the plant and to at least partly compensate the power consumption of the $CO_2$ capture system (18); and
   wherein the first partial flow (21) is recirculated at a recirculation rate, which is controlled at a highest possible recirculation rate under the conditions at which stable complete combustion in the gas turbine (6) can be maintained and at which a residual oxygen concentration after the gas turbine ($GT_{O2}$) is sufficient to maintain stable complete combustion of the supplementary firing (10).

2. The method according to claim 1 wherein an additional ambient air flow, and/or oxygen enriched air flow, and/or oxygen flow (11) is injected into the supplementary firing (10) for stable complete combustion of the supplementary firing (10).

3. The method according to claim 2, wherein the additional ambient air flow, and/or oxygen enriched air flow, and/or oxygen flow (11) is a function of the supplementary firing load.

4. The method according to claim 2, wherein the additional ambient air flow, and/or oxygen enriched air flow, and/or oxygen flow (11) is preheated by low grade heat from a water steam cycle of the combined cycle power plant, and/or the $CO_2$ capture system (18), and/or the flue gases.

5. The method according to claim 1, wherein a sufficient ambient air flow, and/or oxygen enriched air flow, and/or oxygen flow (11) is injected into the supplementary firing (10), such that the recirculation rate can be controlled independently of the oxygen concentration required for stable complete combustion of the supplementary firing (10).

6. The method according to claim 5, wherein the additional ambient air flow, and/or oxygen enriched air flow, and/or oxygen flow (11) is a function of the recirculation rate.

7. The method according to claim 5, wherein the additional ambient air flow, and/or oxygen enriched air flow, and/or oxygen flow (11) is a function of the residual oxygen concentration after the gas turbine ($GT_{O2}$).

8. The method according to claim 5, wherein the additional ambient air flow, and/or oxygen enriched air flow, and/or oxygen flow (11) is a function of the recirculation rate and/or a function of the residual oxygen concentration after the gas turbine and/or a function of the supplementary firing load.

9. The method according to claim 1, wherein the supplementary firing (10) is operated to increase the power output for power augmentation during peak demand and to increase its operational flexibility.

10. The method according to claim 1, wherein residual oxygen concentration varies as a function of load of the residual firing.

11. A combined cycle power plant comprising at least one gas turbine (6), a compressor (1) for compressing inlet gas (3), a combustor (4) for combustion of fuel (5) in with the compressed gas, and a turbine (7) for expanding pressurized hot gases combustion gas, at least one heat recovery steam generator (9), downstream of the turbine at least one steam turbine (13), at least one $CO_2$ capture system (18), downstream of the heat recovery steam generator (HSRG) (9) receiving a first portion of flue gas and then exhausting a remaining first portion of the flue gas in an exhaust stack, and a flue gas recirculation line recirculating a second portion of the flue gas from heat recovery steam generator (HSRG) (9) to a compressor inlet, and a flue gas line from the heat recovery steam generator (HSRG) (9) exhausting a third portion of the flue gas to the exhaust stack, wherein a low excess air supplementary firing (10), which can be operated in a gas flow with less than 10% oxygen concentration with a stoichiometric ratio below 2, is integrated into the heat recovery steam generator (HSRG) (9) or installed as a duct firing (10) in a flue duct from the gas turbine to the heat recovery steam generator (HSRG) (9) is provided.

12. The combined cycle power plant according to claim 11, wherein ambient air supply lines, and/or oxygen enriched air supply lines, and/or oxygen supply lines to the low excess air supplementary firing (10) are provided.

13. The combined cycle power plant according to claim 11, further comprising an oxygen enrichment plant and/or an air separation unit.

14. The combined cycle power plant according to claim 11, wherein at least one oxygen measurement device is installed to measure oxygen concentrations of inlet gases of a compressor inlet gas (2) and/or to measure a residual oxygen concentration of hot flue gases of a gas turbine (8) and/or to measure a residual oxygen concentration of flue gases (19) from the heat recovery steam generator (9).

15. The combined cycle power plant according to claim 11, wherein at least one $CO_2$ measurement device is installed to measure a $CO_2$ concentration of inlet gases of a compressor inlet gas (2) and/or to measure a $CO_2$ concentration of hot flue gases of a gas turbine (8) and/or to measure a $CO_2$ concentration of flue gases (19) from the heat recovery steam generator (19).

* * * * *